May 31, 1932. W. A. BARRETT 1,861,292
LIQUID TEMPERATURE CHANGING DEVICE
Filed Dec. 9, 1930
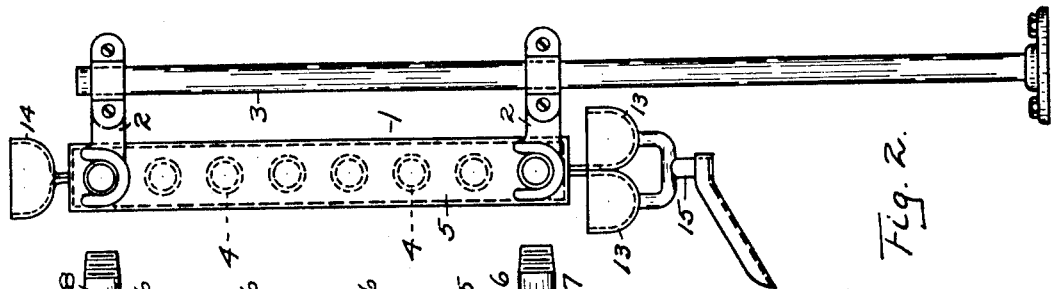
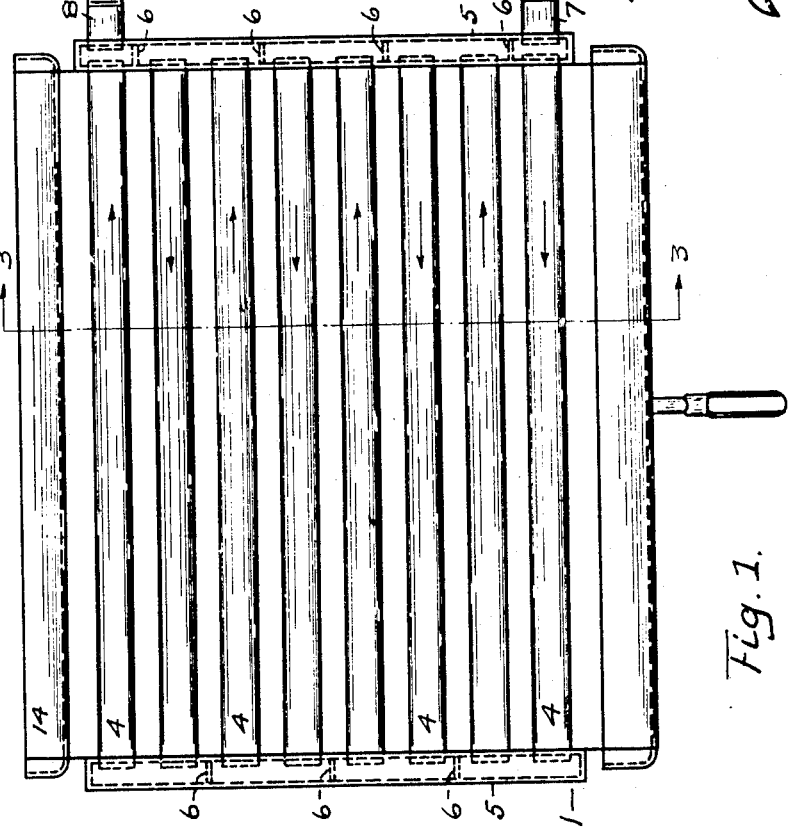
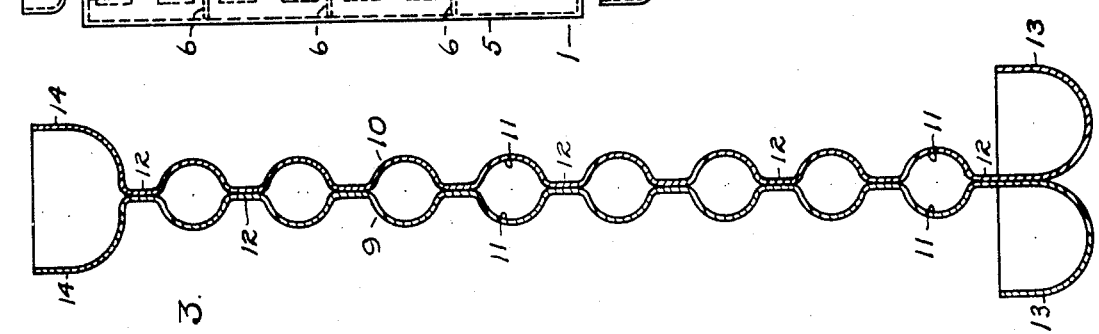
INVENTOR
Walter A. Barrett
BY
ATTORNEY Patented May 31, 1932

1,861,292

UNITED STATES PATENT OFFICE

WALTER A. BARRETT, OF FORT WAYNE, INDIANA

LIQUID TEMPERATURE CHANGING DEVICE

Application filed December 9, 1930. Serial No. 501,070.

The invention relates to appliances for heating or cooling milk and other liquids.

In temperature changing devices, especially those for use in the dairy industry, it is essential that there shall be no crevices, cracks, joints or other pockets in which the milk or other product being treated can lodge and become a source of contamination to subsequent products being treated. Devices for the purpose have been constructed in which a series of parallel tubes is so mounted that a cooling or heating medium may be circulated through the tubes and the product to be treated flows down the outer surfaces of the tubes. The practice has been in such constructions to fill the spaces between the tubes with solder or to weld strips to adjacent tubes and apply solder in the corners in order to secure a surface for the product to flow over. It is most difficult to prevent cracks or crevices or pockets forming in the fillers and joints and thereby avoid contamination of the product being treated.

The object of my invention is to provide a temperature changing device wherein the tubes are so formed as to present a one piece continuous surface over which the product to be treated flows and thereby avoid all cracks, crevices or pockets in which the product may lodge.

The invention consists in a series of spaced parallel tubes formed from two channeled sheets of material, the walls of the opposing channels in which sheets, when the spacing portions of the sheets are properly secured together, form tubes, the surface of each tube being continuous with the adjacent spacing portion of the sheet, and means being provided at the opposite ends of the tubes whereby a cooling or heating medium may be circulated through the tubes.

The invention is illustrated in the accompanying drawings in which

Figure 1 is an elevational view of a device embodying the invention; Fig. 2 an end view of the device and Fig. 3 is an enlarged cross section on line 3—3 of Fig. 1.

Referring to the illustrative embodiment of the invention 1 designates the device generally mounted in any convenient manner, as by the brackets 2 upon the standards 3, the brackets being secured to the device and suitably attached to the standards.

The tubes 4 extend at opposite ends into the headers 5 and are suitably sealed therein. The headers are divided by cross partitions 6 into compartments or passages which communicate with the tubes in pairs such that a cooling or heating medium which enters at 7 into the lowermost tube will flow or circulate upwardly through all the tubes in succession and discharge at 8 from the uppermost tube.

The tubes of selected number are formed as a unit in two corresponding sections 9 and 10. Each section comprises a sheet of metal that is pressed or otherwise formed into vertically spaced semi-cylindrical transverse channels 11 with substantially flat sections 12 between adjacent channels and rounding into the walls of those channels so as to avoid square corners or crevices. The portion of the sheet below the lowermost channel may be cupped to form a trough 13 and the portion of the sheet above the uppermost channel may be flared outwardly and upwardly to form one-half of an upper trough 14. The two channeled sections are assembled with the spacers or substantially flat sections 12 in contact and the abutting sections 12 are secured together, as by welding. The channels of each section now oppose each other and form the complete tubes 4, the trough sections 14 form a complete trough and the lower troughs 13 are upon opposite sides of the tubes. A suitable discharge pipe 15 is connected to the troughs 13. The product to be treated is suitably supplied to the upper trough 14 from which it overflows in a film down the tubes.

Since each section 9, 10 is in one piece the outer surface of each tube is continuous with the outer surface of each adjacent spacer, hence a continuous surface on each side of the device is presented to the flowing product being treated and there is no crack or crevice or ledge in or on which the product may lodge and complete cleansing of the device is evidently possible.

What I claim is:

1. In a device of the class described, two transversely corrugated sheets each sheet having substantially flat portions between the corrugations, the lower portion of each section being turned upwardly to form a trough and the upper portion of each section being flared outwardly, the substantially flat portions of the sections being secured together to cause the opposed corrugated portions to form tubes and the upper flared portions to form a trough and means at the opposite ends of the tubes to connect them in series and form a continuous fluid passageway through the tubes.

2. A temperature changing device comprising two sheets of material each sheet having a plurality of spaced parallel channels formed therein, the portion of the sheet above the uppermost channel being flared outwardly and upwardly, the portions of the sheets between the channels being secured together whereby the walls of corresponding channels in the sheets form tubes and the flared portions form a trough and means to connect the tubes in series whereby to form a continuous fluid passageway through the tubes.

In witness whereof I have hereunto subscribed my name.

WALTER A. BARRETT.